(12) United States Patent
Devitt

(10) Patent No.: US 10,100,932 B2
(45) Date of Patent: Oct. 16, 2018

(54) THRUST BEARING AS A SEAL

(71) Applicant: NEW WAY MACHINE COMPONENTS, INC., Aston, PA (US)

(72) Inventor: Andrew J. Devitt, Media, PA (US)

(73) Assignee: NEW WAY MACHINE COMPONENTS, INC., Aston, PA (US)

( * ) Notice: Subject to any disclaimer, the term of this patent is extended or adjusted under 35 U.S.C. 154(b) by 331 days.

(21) Appl. No.: 14/869,539

(22) Filed: Sep. 29, 2015

(65) Prior Publication Data

US 2016/0090991 A1    Mar. 31, 2016

Related U.S. Application Data

(60) Provisional application No. 62/057,058, filed on Sep. 29, 2014, provisional application No. 62/057,066, (Continued)

(51) Int. Cl.
  *F04D 29/10* (2006.01)
  *F16J 15/34* (2006.01)
  (Continued)

(52) U.S. Cl.
  CPC .......... *F16J 15/342* (2013.01); *F04D 29/104* (2013.01); *F04D 29/124* (2013.01); *F16C 17/04* (2013.01);
  (Continued)

(58) Field of Classification Search
  CPC ............. F04D 29/0413; F04D 29/0416; F04D 29/0513; F04D 29/0516; F04D 29/057; F04D 29/104; F04D 29/122
  See application file for complete search history.

(56) References Cited

U.S. PATENT DOCUMENTS 3,395,949 A * 8/1968 Kun ...................... F01D 25/22
                                                              384/119
4,118,042 A * 10/1978 Booth ................. F16C 32/0603
                                                              277/431

(Continued)

FOREIGN PATENT DOCUMENTS

GB             1367973 A     9/1974
WO         2009054560 A1    4/2009
(Continued)

*Primary Examiner* — Ninh H Nguyen
(74) *Attorney, Agent, or Firm* — Volpe and Koenig, P.C.

(57) ABSTRACT

A porous media ventless thrust bearing seal is disclosed. The porous media thrust bearing may include a primary porous media thrust bearing also serving as a seal ring including porous media positioned over a plenum and a port connected to the plenum, and conductive passages for communicating pressurized fluid to the plenums through the ports of the primary ring. The porous media ventless thrust bearing may also include a treated process gas supplied to a port which is closest to the untreated process gas, at a pressure which is higher than the untreated process gas. An inert gas (or fluid in a liquid state) may be supplied to the remaining port, at a pressure which is the same as the untreated process gas. A certain amount of treated process gas may flow into the untreated process gas, and may prevent the untreated gas from entering the porous media seal.

9 Claims, 15 Drawing Sheets

Related U.S. Application Data filed on Sep. 29, 2014, provisional application No. 62/113,172, filed on Feb. 6, 2015.

(51) Int. Cl.

| | |
|---|---|
| *F16J 15/40* | (2006.01) |
| *F16J 15/16* | (2006.01) |
| *F04D 29/12* | (2006.01) |
| *F16C 33/74* | (2006.01) |
| *F16C 17/04* | (2006.01) |
| *F16C 33/12* | (2006.01) |
| *F04D 29/051* | (2006.01) |

(52) U.S. Cl.
CPC ............ *F16C 33/128* (2013.01); *F16C 33/74* (2013.01); *F16J 15/162* (2013.01); *F16J 15/3404* (2013.01); *F16J 15/40* (2013.01); *F04D 29/0513* (2013.01); *F05D 2300/514* (2013.01); *F16C 2360/00* (2013.01); *F16J 15/3496* (2013.01); *F16J 15/406* (2013.01)

(56) References Cited

U.S. PATENT DOCUMENTS

| | | | |
|---|---|---|---|
| 4,523,764 A | 6/1985 | Albers et al. | |
| 4,749,283 A | 6/1988 | Yokomatsu et al. | |
| 4,993,917 A | 2/1991 | Kulle et al. | |
| 5,228,840 A * | 7/1993 | Swank | F04B 1/1075 |
| | | | 417/118 |
| 5,498,007 A | 3/1996 | Kulkarni et al. | |
| 5,529,315 A | 6/1996 | Borrino et al. | |
| 5,553,867 A | 9/1996 | Rockwood | |
| 5,727,792 A | 3/1998 | Rockwood | |
| 6,210,103 B1 * | 4/2001 | Ramsay | F16C 25/02 |
| | | | 277/318 |
| 6,708,981 B2 | 3/2004 | Hall et al. | |
| 7,144,226 B2 | 12/2006 | Pugnet et al. | |
| 7,394,076 B2 | 7/2008 | Devitt | |
| 7,396,017 B2 | 7/2008 | Orlowski et al. | |
| 7,642,523 B1 | 1/2010 | Devitt | |
| 7,997,802 B2 * | 8/2011 | Simon | F01D 3/04 |
| | | | 384/121 |
| 8,753,014 B2 | 6/2014 | Devitt | |
| 9,441,668 B2 | 9/2016 | Devitt | |
| 2004/0086376 A1 | 5/2004 | Baldassarre et al. | |
| 2010/0310354 A1 | 12/2010 | Rickert | |
| 2011/0169225 A1 | 7/2011 | Winkler et al. | |
| 2011/0243762 A1 | 10/2011 | Daikoku et al. | |
| 2012/0163742 A1 | 6/2012 | Underbakke et al. | |
| 2013/0149101 A1 | 6/2013 | Clute et al. | |
| 2013/0188895 A1 | 7/2013 | Devitt | |
| 2014/0225325 A1 | 8/2014 | Bardon et al. | |
| 2014/0286599 A1 | 9/2014 | Devitt et al. | |
| 2014/0294329 A1 | 10/2014 | Devitt | |
| 2016/0265588 A1 | 9/2016 | Devitt et al. | |

FOREIGN PATENT DOCUMENTS

| | | |
|---|---|---|
| WO | 2011061142 A1 | 5/2011 |
| WO | 2014081901 A1 | 5/2014 |

* cited by examiner

THRUST BEARING AS A SEAL

REFERENCE TO RELATED APPLICATIONS

This application claims the benefit of U.S. Provisional Application Nos. 62/113,172, filed Feb. 6, 2015; 62/057,066, filed Sep. 29, 2014; and 62/057,058, filed Sep. 29, 2014, whose disclosures are hereby incorporated by reference in their entireties into the present disclosure.

FIELD OF INVENTION

This subject application provides externally-pressurized porous media technology to serve as a thrust bearing and seal in turbomachinery applications.

BACKGROUND

Turbomachinery applications, such as but not limited to centrifugal compressors (hereinafter a centrifugal compressor is used as a primary example), require shaft sealing in order to prevent leakage of process gas into the atmosphere, or migration of process gas across the seals or into the bearing side of the equipment. A variety of shaft sealing mechanisms exist, including but not limited to, labyrinth seals (a radial seal), oil film seal rings (a radial seal), mechanical contact seals (a face seal), and the most elaborate type of shaft seal—the dry gas seal (a face seal). Dry gas seals provide the best barrier to leakage of all seal types, and are therefore considered the incumbent prior art technology for comparison to the subject invention. Dry gas seals utilize rotating rings that contain micron-sized grooves that allow for face "lift-off" during operation, and thus allow for a minimal controlled amount of seal leakage.

State-of-the-art solutions for dry gas seals include single seals, tandem seals, and double-opposed seals.

In the prior art, tandem dry gas seal arrangement include a primary seal is comprised of a primary (stationary) ring and a mating (rotating) ring, which withstands total pressure, and the secondary seal is comprised of a stationary ring and mating (rotating) ring, which acts as a backup. Primary rings are typically made from carbon, and mating rings are typically made using tungsten carbide, silicon carbide or silicon nitride. Dry sealing gas (which is typically the same as the process gas, but treated) is injected, and is typically at least 50 psi above the process side pressure. Most of the injected dry sealing gas flows across an inner labyrinth seal and into the compressor (into the process gas). A small amount of the dry sealing gas flows across the primary seal and then out of a primary vent. For a single seal arrangement, there is only a primary face and a mating face, with no secondary seal. Otherwise the functionality of a single seal is similar to that of a tandem seal, except for the fact that leakage across the primary seal gets vented, and there is no back-up seal.

Also in the current art, a "double opposed" dry gas seal arrangement is comprised of a primary inboard stationary ring and a primary inboard mating (rotating) ring. Also, there is a secondary outboard stationary ring and a secondary outboard mating (rotating) ring. In this case, an inert gas (such as nitrogen) is injected and flows past both seal faces. The seal gas supply flowing past the primary (inboard) seal migrates into the process side flow, and the seal gas supply flowing past the secondary (outboard) seal goes to a vent.

For the current art types of seals (single, tandem or double-opposed), tandem seals are the most widely-accepted arrangement for industry when considering the best sealing possibility.

There are many drawbacks to any of the above current art seal types. These drawbacks include:

Process gas leakage, although attempted to be controlled, may still exit the primary vent, and must be flared.

Leakage of inert gas into the process side (for a double-opposed seal) can cause problems inside the compressor by affecting the process.

Double-opposed dry gas seals have not been widely accepted in the industry (tandem seals are more widely accepted).

Flow across the seal faces for dry gas seals can contain sealing gas and process gas. This is a bad fundamental design to allow these gases across the seal gap.

Dry gas seals have a large flow of seal gas past the inner labyrinth seal, into the process side of compressors.

Dry gas seals have very high flow rates.

Seal faces can "ring" together during shut-down, resulting in very high start-up torques, or no-start conditions.

Seal faces can distort as a result of high pressures or local heating.

Small gaps result in heat generation at high speeds.

Fluids will carbonize from shear in small gaps.

A high percentage of seal failures are at start-up or shut-down.

Seal failures can result from impure seal gas supply.

While any seal may be optimized for a specific application to reduce some of these drawbacks, an improved seal that may minimize some or most of the drawbacks is desirable.

Current arrangements of typical rotating assemblies in turbomachinery, such as centrifugal compressors, include two radial bearings, two shaft seals (commonly dry gas seals), a thrust bearing, and likely a balance piston (to minimize thrust loading). Furthermore, each of these components has accompanying inputs and outputs. For example, dry gas seals have incoming buffer gas, incoming inert seal gas, incoming separation gas, and two outgoing vents. Radial bearings have oil inputs and drains, along with a bearing box vent. Also, thrust bearings have an oil input and output. Hence, a typical arrangement will have six vents, two drains, three seal gases, and oil.

SUMMARY

Briefly stated, an embodiment presented utilizes a porous material which is externally pressurized with gas to effect the key sealing function, which occurs as a face seal arrangement. The embodiment removes or minimizes the aforementioned disadvantages for tandem and double-opposed seals as mentioned in the previous section.

The subject embodiment allows for the integration of porous media sealing into existing single, tandem, or double-opposed arrangements. In each of these arrangements, there are numerous advantages over the prior art, and these are explained herein. Furthermore, a so-called ventless seal arrangement allows for zero emissions of process fluid, and also allows use of clean process gas as the buffer gas to the ventless seal. Lastly, the subject embodiments allow for the elimination of seals altogether at the radial bearing locations by incorporating a ventless seal into the thrust bearing or balance piston.

In all proposed arrangements, low flow rates of external gas are required, thus allowing for large savings in injected gas cost. Also, a drastic reduction in seal panel complexity results from the use of externally-pressurized porous media as seals.

BRIEF DESCRIPTION OF THE DRAWINGS

The foregoing summary, as well as the following detailed description of the preferred embodiments, will be better understood when read in conjunction with the appended drawings. For the purpose of illustrating the invention, there is shown in the drawings embodiments which are presently preferred. It should be understood, however, that the invention is not limited to the precise arrangement shown.

DETAILED DESCRIPTION OF THE PREFERRED EMBODIMENTS

Figure 1A:
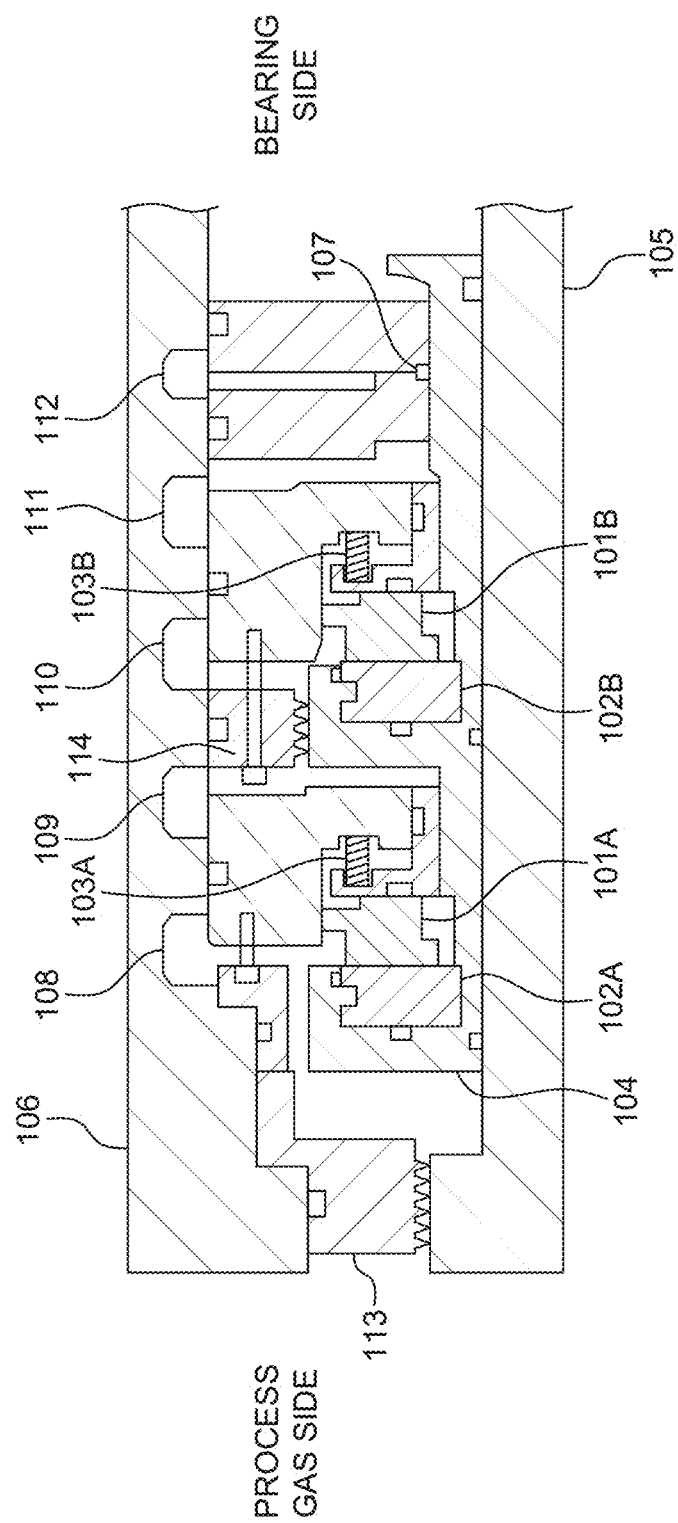
FIG. 1A shows a depiction of a cross section of a typical dry gas tandem seal

Hereinafter the term "ventless" shall mean that no treated process (sealing) gas, or less than the amount of a conventional dry gas seal, needs to be vented. The embodiments described herein also allow for the use of externally-pressurized porous media seals for the following configurations: a porous media single seal, a porous media tandem seal, and a porous media double-opposed seal, resulting in numerous benefits from the incorporation, thereof. These can be used for shaft sealing applications on turbomachinery such as, but not limited to, centrifugal compressors.

Furthermore, a porous media ventless thrust bearing seal is disclosed. The porous media thrust bearing may include a primary porous media thrust bearing also serving as a seal ring including porous media positioned over a plenum and a port connected to the plenum, and conductive passages for communicating pressurized fluid to the plenums through the ports of the primary ring. The porous media ventless thrust bearing may also include a treated process gas supplied to a port which is closest to the untreated process gas, at a pressure which is higher than the untreated process gas. An inert gas (or fluid in a liquid state) may be supplied to the remaining port, at a pressure which is the same as the untreated process gas. A certain amount of treated process gas may flow into the untreated process gas, and may prevent the untreated gas from entering the porous media seal. This subject application provides externally-pressurized porous media technology to create a porous media ventless seal for turbomachinery applications, meaning that no treated process (sealing) gas needs to be vented. The subject invention may be used for thrust bearing and shaft sealing applications on turbomachinery such as, but not limited to, centrifugal compressors.

Certain terminology is used in the following description for convenience only and is not limiting. The words "front," "back," "left," "right," "inner," "outer," "upper," "lower," "top," and "bottom" designate directions in the drawings to which reference is made. Additionally, the terms "a" and "one" are defined as including one or more of the referenced item unless specifically noted otherwise. A reference to a list of items that are cited as "at least one of a, b, or c" (where a, b, and c represent the items being listed) means any single one of the items a, b, or c, or combinations thereof. The terminology includes the words specifically noted above, derivatives thereof, and words of similar import.

In FIG. 1A a typical tandem dry gas seal arrangement has a primary seal, comprised of a primary (stationary) ring 101A and a mating (rotating) ring 102A, which withstands total pressure, and the secondary seal, comprised of a stationary ring 101B and mating (rotating) ring 102B, acts as a backup. Primary rings are typically made from carbon, and mating rings are typically made using tungsten carbide, silicon carbide, or silicon nitride. A shaft sleeve 104 is coupled to a rotating shaft 105, and the compressor head is shown as 106. Springs 103A and 103B create force to maintain a bias of the stationary rings onto the face of the mating rings 102A and 102B. Dry sealing gas (which is typically the same as the process gas, but treated) is injected at seal gas supply location 108, and is typically at least 50 psi above the process side pressure. The dry sealing gas must be a very "clean" gas, having solid particles at least 10 microns or less in size (preferably only 3-4 microns in size). Most of the injected dry sealing gas flows across an inner labyrinth seal 113 and into the compressor (into the process gas). A small amount of the dry sealing gas flows across the primary seal and then out of the primary vent 109. Additionally, as shown, an inert seal gas is injected at inert seal gas supply location 110 with a dual purpose: it keeps leakage from the primary seal from escaping out of the secondary vent 111 by flowing inert gas across an intermediate labyrinth seal 114, and it also flows past the secondary seal, and out of the secondary vent 111. The remainder of the gas passing out of the secondary vent 111 is separation gas supply 112 which passes over a barrier seal 107, which is designed to keep oil lubrication (from the bearing side) from migrating to the secondary or primary gas seals. Hence, flow through the primary vent 109 is a combination of injected (treated) dry sealing gas and inert gas, and flow through the secondary vent 111 is a combination of inert gas and separation gas.

It is noted that, in addition to a tandem seal arrangement, a typical single seal arrangement is comprised of only a primary face and a mating face, with no secondary seal. Otherwise the functionality of a single seal is similar to that of a tandem seal, except for the fact that leakage across the primary seal gets vented, and there is no back-up seal.

Figure 2A:
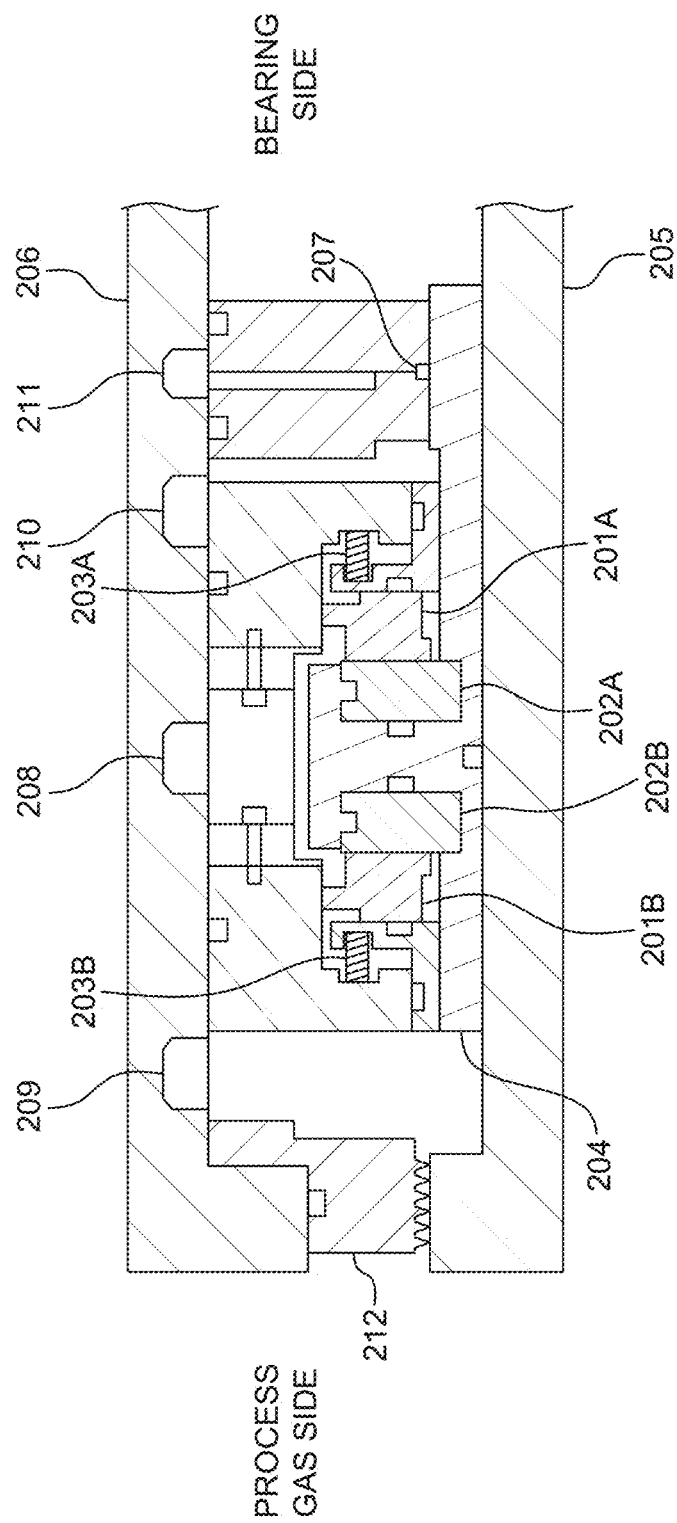
FIG. 2A shows a depiction of a cross section of a typical dry gas double-opposed seal.

Similarly, FIG. 2A shows a typical "double opposed" dry gas seal arrangement. For the double opposed arrangement, there is a primary inboard stationary ring 201B and a primary inboard mating (rotating) ring 202B. Also, there is a secondary outboard stationary ring 201A and a secondary outboard mating (rotating) ring 202A. A shaft sleeve 204 is coupled to a rotating shaft 205, and the compressor head is shown as 206. Springs 203A and 203B create force to maintain a bias of the stationary rings onto the face of the mating rings. In this case, an inert gas (such as nitrogen) is injected at seal gas supply location 208, and flows past both seal faces. The seal gas supply flowing past the primary (inboard) seal migrates into the process side flow, and the seal gas supply flowing past the secondary (outboard) seal goes to the vent 210. The treated flushing gas introduced at port location 209 between the inner labyrinth seal 212 and the inboard seal is typically maintained at a pressure higher than that of the process side, in order to prevent untreated process gas from contaminating the face of the primary seal. Hence, the inert gas flow across the primary seal flows across the inner labyrinth seal 212, and into the process side, and is not vented. Separation gas, used to prevent leakage across barrier seal 207 is introduced at port location 211. The inert gas flow across the secondary seal is mixed with separation gas and is vented through the vent 210.

Existing technology, as represented by FIGS. 1A and 2A, are comprehensively described in the John Stahley's "Dry Gas Seals Handbook", ©2005.

In order to drastically transform the operation of either of the current art arrangements discussed above, FIGS. 1B and 2B show the incorporation of a porous media, which acts as a seal, into the primary rings in both figures.

Figure 1B:
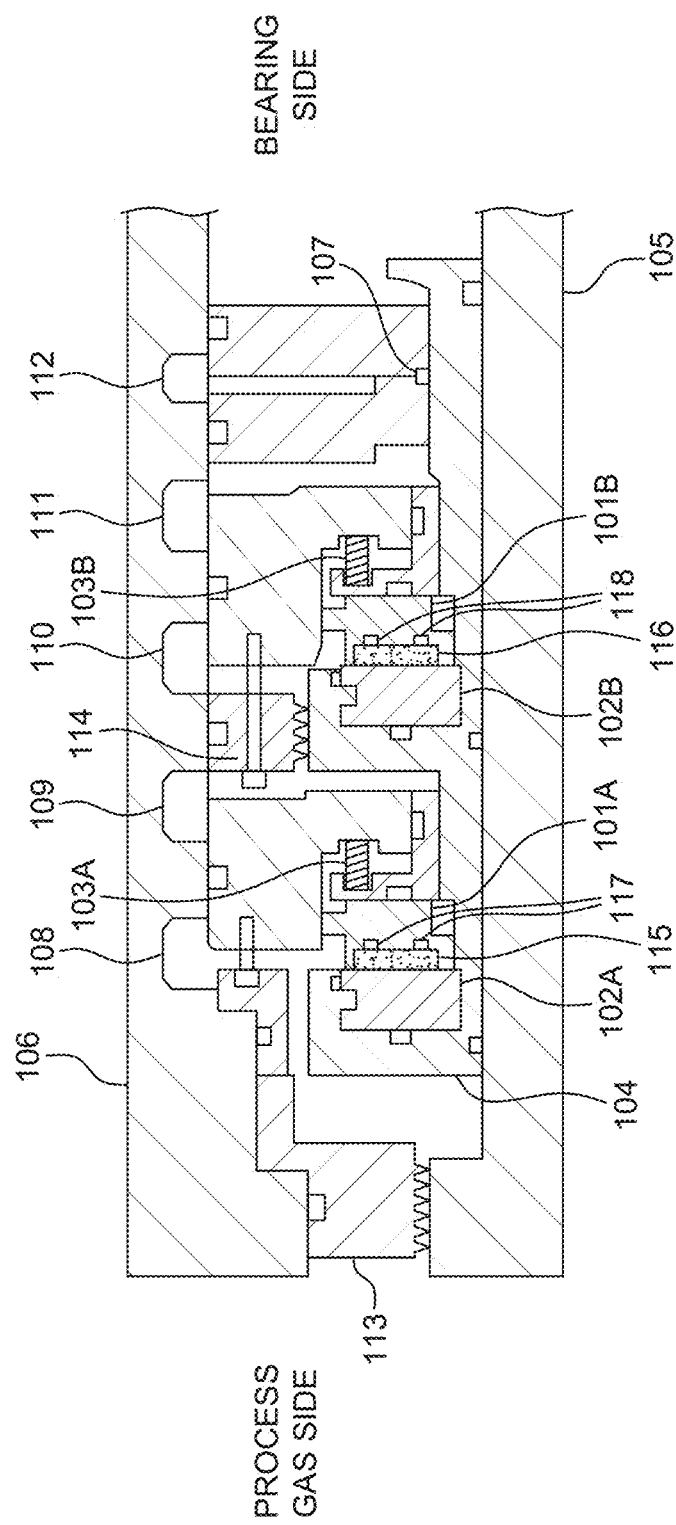
FIG. 1B shows a depiction of a cross section of a dry gas tandem seal with porous media incorporated.
Figure 2B:
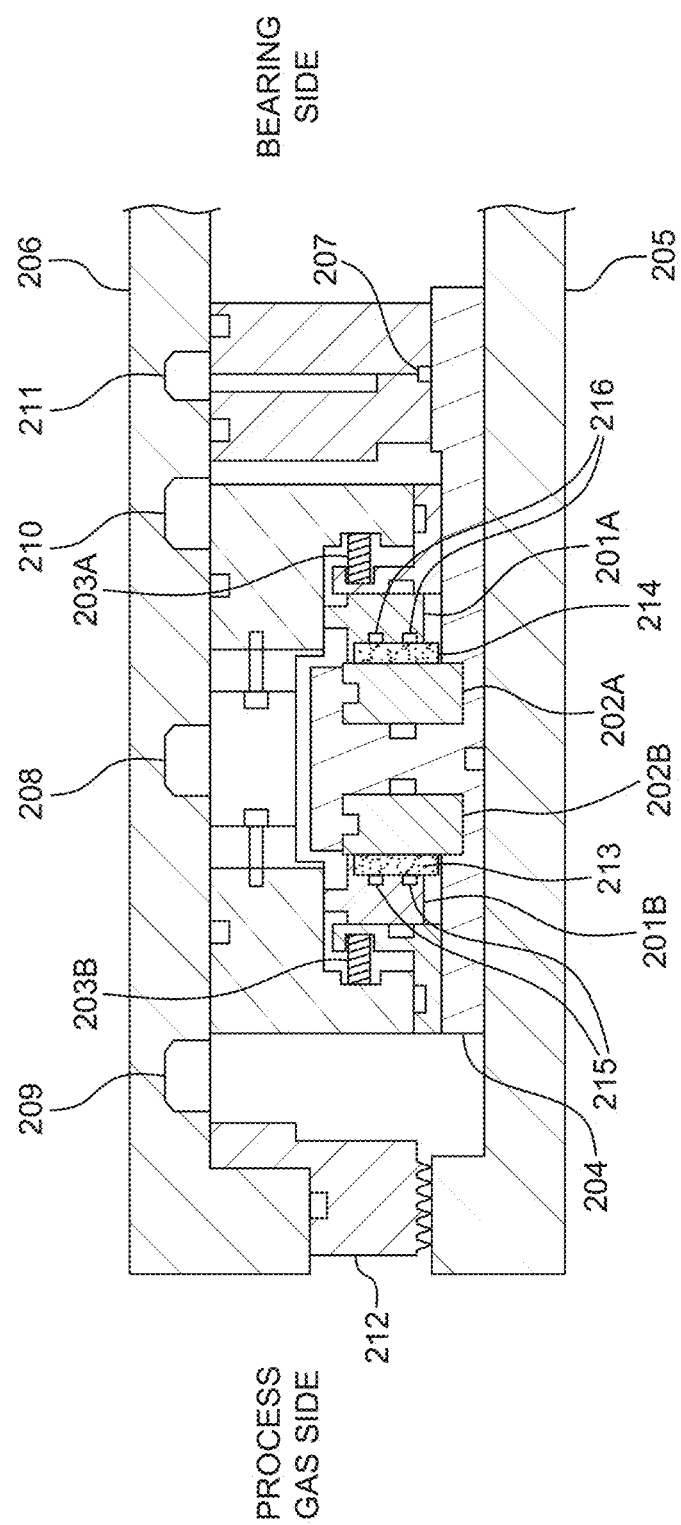
FIG. 2B shows a depiction of a cross section of a dry gas double-opposed seal with porous media incorporated.

In FIG. 1B, a porous media ring 115 is included in the primary stationary ring 101A, and a porous ring 116 is included in the secondary stationary ring 101B. In FIG. 2B, a porous media ring 212 and 213 are included in the primary rings. Employing a porous media gas seal as shown in FIGS. 1B and 2B will result in the porous media functioning as discussed in U.S. Pat. No. 8,753,014 by Devitt.

In FIG. 1B, a shaft sleeve 104 is coupled to a rotating shaft 105, and the compressor head is shown as 106. Springs 103A and 103B create force to maintain a bias of the stationary rings onto the face of the mating rings 102A and 102B. Seal gas pressure from location 108 can be supplied to the plenums 117 under the porous ring 115 at a pressure of 50-300 psig greater than the process gas side pressure. This seal gas flows through the porous ring 115 at a low flow rate of 1-10 scfm. This flow through the porous ring 115 will allow the seal gas to flow through the inner labyrinth 113 and into the process gas side. Also, some leakage may exit the porous ring 115 and flow to the primary vent 109. As in the case of FIG. 1A, inert gas will be injected at location 110, and can be directed into plenums 118, migrating through the porous ring 116. Inert gas leakage across porous ring 116 will migrate across the intermediate labyrinth 114 to prevent primary seal leakage from reaching the secondary vent 111, and inert gas leakage across the porous ring 116 will also migrate to the secondary vent 111. The remainder of the gas passing out of the secondary vent 111 is separation gas supply 112 which passes over a barrier seal 107, which is designed to keep oil lubrication (from the bearing side) from migrating to the secondary or primary gas seals. Hence, flow through the primary vent 109 is a combination of injected (treated) dry sealing gas and inert gas, and flow through the secondary vent 111 is a combination of inert gas and separation gas. A key advantage to this arrangement is that there will no longer be gas leakage across the seal face, but rather through the porous media. A list of other advantages are included below. As an option, the treated sealing gas which is injected into the primary seal may be replaced with an inert gas (such as Nitrogen), if permitted by the turbomachinery provider. Although this would leak inert gas into the process side, this would prevent any leakage of treated seal gas out of the primary vent.

In FIG. 2B, inert gas, such as Nitrogen, is injected at location 208. It is directed into plenums 215 and 216, and allows leakage through the porous rings 213 and 214. This leakage through porous ring 213 migrates into the process gas side, and leakage through porous ring 214 migrates through the vent 210. Otherwise, functionality of this arrangement is similar to that of FIG. 1B.

The arrangements shown in FIGS. 1B and 2B are considered "naturally stable" arrangements.

Some example benefits of the FIGS. 1B and 2B arrangements may include:

External pressurization may allow frozen seal faces to pop open before rotation.

Pressure is evenly distributed across the seal face, which may maintain laminar flow for less heat production. (FIG. 3 explains how flow into the gap as a result of using porous media may allow for a much larger flow area.)

Low flow rates of injected gas may be possible by using porous media. For example, a typical compressor total seal gas supply could be on the order of 300 scfm or more, compared to primary seal flow required for a ventless seal which may be on the order of 20 scfm.

An optional benefit may exist if the porous media faces are thin enough to conform to the surface of the mating ring.

Since the injected treated seal gas in the ventless seal flows into the compressor process side, it is self-defending. Therefor there may be no pressure drop across the seal face; the highest pressure is in the seal gap. This optimizes the design of a seal face, as opposed to having flow across the seal face.

Managing the quality of the injected gas stream through a ventless seal may be significantly easier than that of a dry gas seal. External pressure may allow for increased gap sizes. The reason for this is due to the fact that the flow rate through porous media, and specifically through the ventless seal, will be at least an order of magnitude less than that of prior art. With such low flow leakage across the process seal, much less filtering of the injected gas stream will be required, greatly simplifying the overall system.

Figure 3:
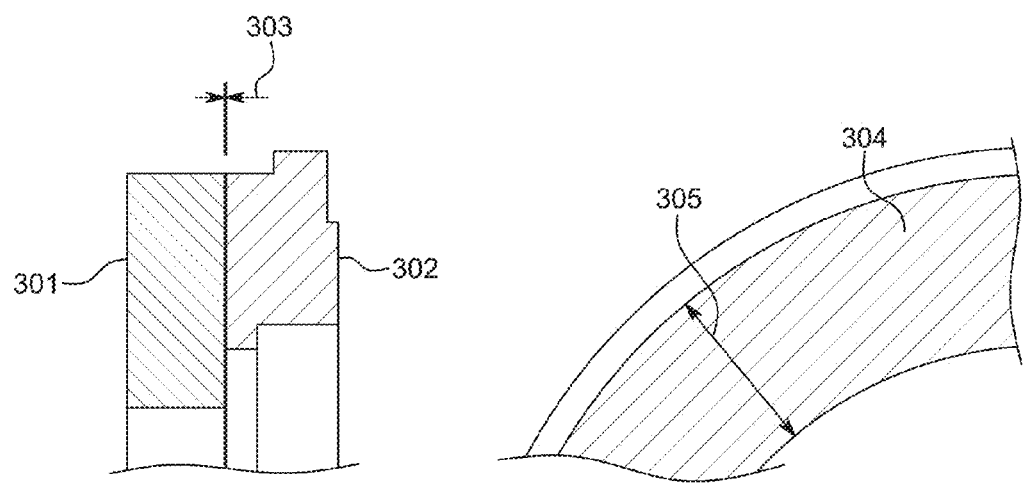
FIG. 3 shows a depiction comparing flow area of aerodynamic and aerostatic seal faces.

FIG. 3 highlights the advantage of how a porous media face allows for a much larger flow area than that of an aerodynamic seal, such as a dry gas seal. In FIG. 3, for an aerodynamic seal, flow enters the gap 303 established between the primary face 302 and mating face 301. The flow area is defined by the following equation: $\pi *(D_{OUTSIDE\ DIAMETER})*GAP$. However, the flow area 304 for a porous media aerostatic seal encompasses the entire distance 305 across the face of the aerostatic seal, and is defined by $\pi *(D^2_{OUTSIDE\ DIAMETER} - D^2_{INSIDE\ DIAMETER})$. Hence, the flow area for an aerostatic seal is thousands of time greater than the flow area for an aerodynamic seal.

As a means of eliminating venting of (treated) process gas, and even worse the possible migration of actual process gas from the compressor side, the following discussion focuses on a ventless seal. The ventless seal uses porous media and may provide for all of the benefits discussed heretofore for the FIGS. 1B and 2B arrangements, and may provide even further advantages.

Figure 4:
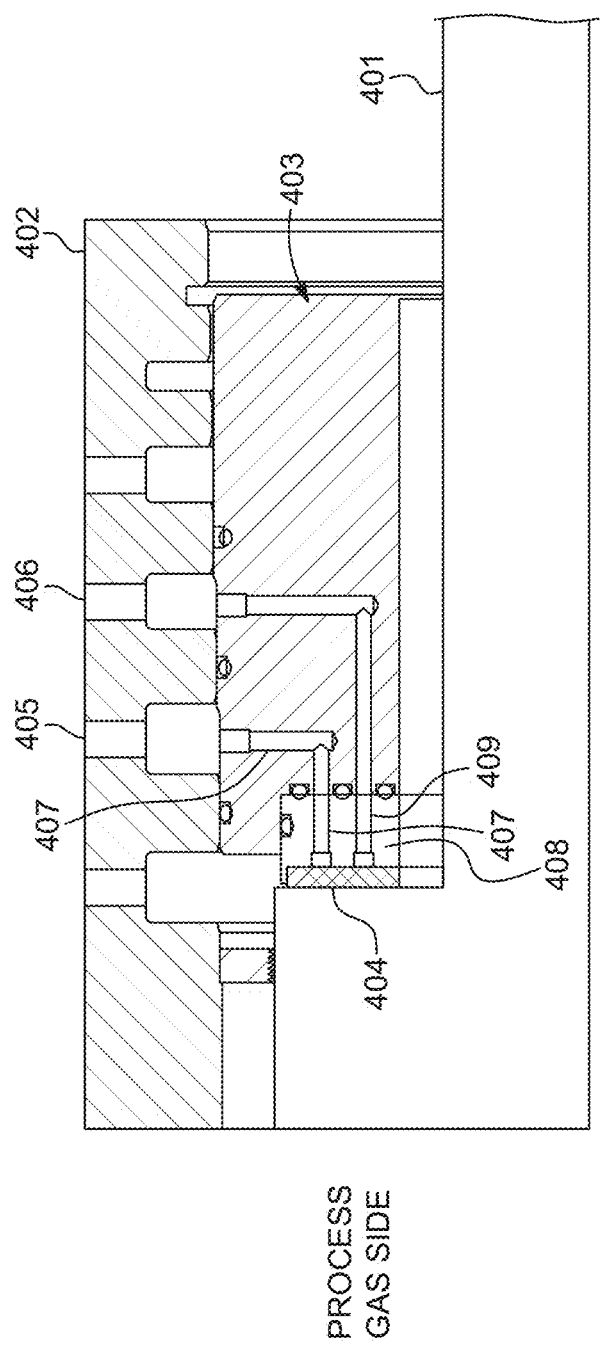
FIG. 4 is an example of a 2-port ventless seal arrangement.

FIG. 4 shows a rotating shaft 401, compressor head 402, and a stationary member 403 containing grooves 407 and 409, which continue through the stationary member 403 and also into holder 408. Treated process gas is introduced into port 405, and inert gas (such as Nitrogen) is introduced into port 406. Both gases are to be at a pressure which is higher than gas on the compressor side of the seal. In this case, the seal is a porous media ring 404, and functions similarly to that taught by Devitt in U.S. Pat. No. 8,753,014. The injected gases will flow through grooves 407 and 409 and then through the porous media ring 404 and create a very small (1 to 10 micron) gap. Since the two gases shown will be at the same pressure, the injected (treated) process gas will flow through the porous media and into the process side of the compressor. The inert gas will flow through the porous media and then will flow in the direction opposite that of the treated seal gas flow, and can be vented. Both gases will be injected across the porous media at 50 to 300 psi higher than the pressure in the process side of the compressor, but the flow rate will be very low (such as on the order of 1 to 10 scfm). Since there will be such a high pressure differential, yet such a low flow rate, this will provide a significant benefit as compared to managing conventional dry sealing (buffer) gas. For example, if the process side of the compressor is operating at 2,000 psig, the pressure of the treated process gas through groove 407 could be at 2,200 psig, and the pressure of the inert gas through groove 409 could also be adjusted to a pressure to balance the pressure in the gap so that there is no flow from the process side into the porous media gap. This would result in all of the treated process gas flowing into the system process gas, and would prevent system process gas from entering the porous media seal area. The adjustable pressure of the inert gas would flow in the opposite direction, and could be vented. Neither gas would overcome the other gas within the porous media, and therefore treated process gas would not flow in the direction of the vent. Total seal leakage for a typical seal running at over 10,000 rpm at 1,000+ psig may be in the range of 150-200 scfm. The ventless seal may consume on the order of 20 scfm per compressor. The key advantage of this arrangement is that zero (treated) process gas will need to be vented. Also, there will be no possible way for any of the actual process gas from the compressor ever migrating past the seal, as well.

Furthermore, 8 shows additional details, as used in a working prototype of a ventless seal. Shaft 801 is coupled to a runner 810 which provides an opposing face to porous media 809, which is held by holder 808. The conductive passages to the porous media are shown as 802 and 803. Passage 802 allows treated gas to flow through porous media gap and into the process gas. Passage 803 is for the injected inert gas which will provide balance in the porous media gap so that no flow of process gas occurs across the porous media gap. However, if, due to some nonconformity of the porous media and runner 810 face, the injection of gas into conductive passages 804 and 805 will allow for additional preloading on the backside of holder 808 in a 360 degree fashion. These gases may be adjusted independently to allow for adjusting restriction in the gap, and therefore allowing the porous media face and the opposing face of runner 810 to maintain a consistent gap. O-rings 806 (typical) are used to seal passages 804 and 805 from escaping gases. O-rings 807 (typical) are used for sealing gases or fluids supplied through passages 802 and 803.

Figure 5:
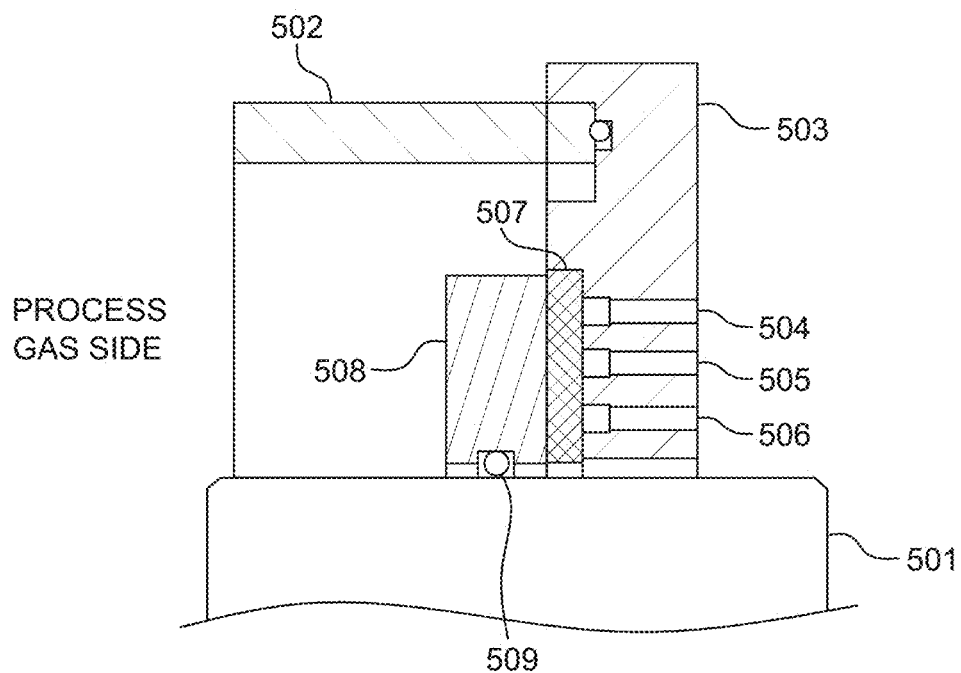
FIG. 5 is an example of a 3-port ventless seal arrangement.

Additionally, a particle counter (not shown) may be employed to detect any undesired process gas on the vent side of the seal. If such process gas is detected, electronic feedback may provide for control of a valve which will supply an adjusted pressure to passages 802, 803, 804 or 805 in order to mitigate such leakage by providing additional pressure balancing. FIG. 5 shows an alternate arrangement of the Ventless seal, in which more than two ports are used. In this arrangement, holder 503 is attached to compressor head 502, and holder 503 contains grooves 504, 505 and 506, with groove 506 being an additional groove, as compared to the arrangement in FIG. 4. A porous media ring 507 may be contained in holder 503, and a runner 508 may be attached to a rotatable shaft 501 via O-ring 509.

In this arrangement, treated process gas can be injected into a port which flows into groove 504, and an inert gas can be injected into another port which flows into groove 505. Each of these two gases can have the same pressure, so that, as in FIG. 4, the treated process gas will flow through the porous media and into the process side of the compressor. The inert gas will flow through the porous media and then in the opposite direction, and can be vented. Both gases will be injected across the porous media at 50 to 300 psi higher than the pressure in the process side of the compressor, but the flow rate will be very low (such as on the order of 1 to 10 scfm). The third groove 506 can be used to allow the introduction of inert gas at a different pressure. For example, if the process side of the compressor is operating at 2,000 psig, the pressure of the treated process gas through groove 504 could be at 2,200 psig, and the pressure of the inert gas through groove 505 could also be adjusted to a pressure to balance the pressure in the gap so that there is no flow across the porous media gap. This would result in treated process gas flowing into the system process gas, and would prevent system process gas from entering the porous media seal area. The adjustable pressure of the inert gas would flow in the opposite direction, and could be vented. Neither gas would overcome the other gas within the porous media, and therefore treated process gas would not flow in the direction of the vent. Additionally, in this case, a third groove 506 could allow for the introduction of a different pressure. Continuing with the above example, inert gas could be introduced into the third groove at an intermediate pressure, and could be used for additional balancing at the seal face.

Figure 6:
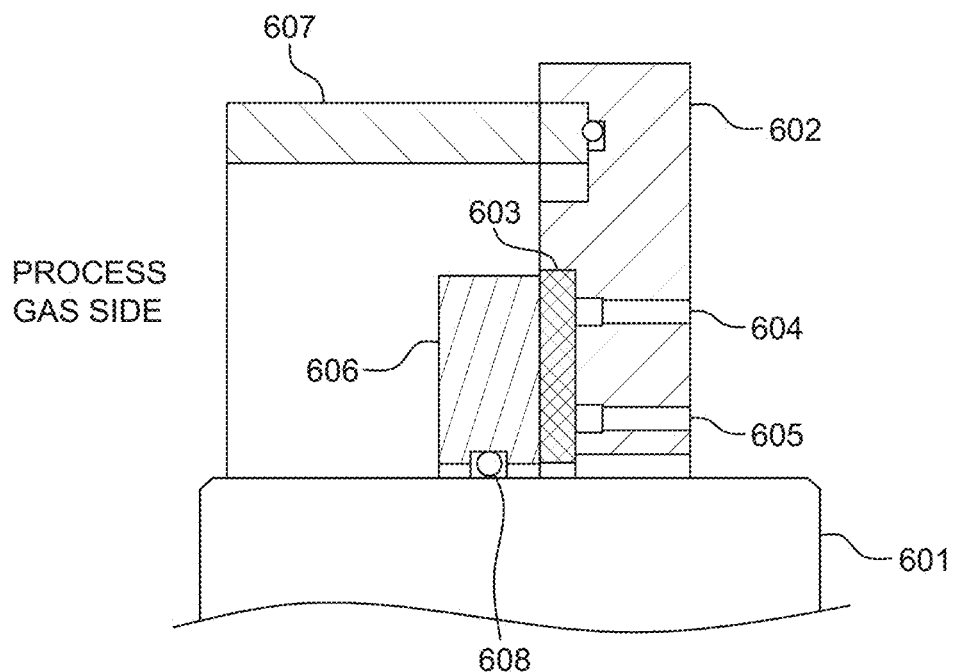
FIG. 6 is an example of a multiphase ventless seal.

It is noted in the above discussion that in lieu of an inert gas, a fluid in another state (such as water) could be used, constituting a multiphase ventless seal. For example, in FIG. 6, holder 602 is attached to compressor head 607, and holder 602 contains grooves 604 and 605. A porous media ring 603 may be contained in holder 602, and a runner 606 may be attached to a rotatable shaft 601 via O-ring 608. In this arrangement, treated process gas can be injected into a port which flows into groove 604, and a fluid can be injected into another port which flows into groove 605. Both the gas and the fluid can have the same pressure, so that, as in FIGS. 4 and 5, the treated process gas will flow through the porous media and into the process side of the compressor. The injected fluid will flow through the porous media and then in the opposite direction, and can be vented. Both the treated process gas and the fluid will be injected across the porous media at 50 to 300 psi higher than the pressure in the process side of the compressor, but the flow rate will be very low (such as on the order of 1 to 10 scfm). A key feature of this arrangement is that gases and fluids can both be introduced into the porous media, and can exist in the "gap" formed on the surface of the porous media. One further point is that, as in FIG. 5, a the possibility exists for a multiphase ventless seal to have more than two grooves.

Figure 7:
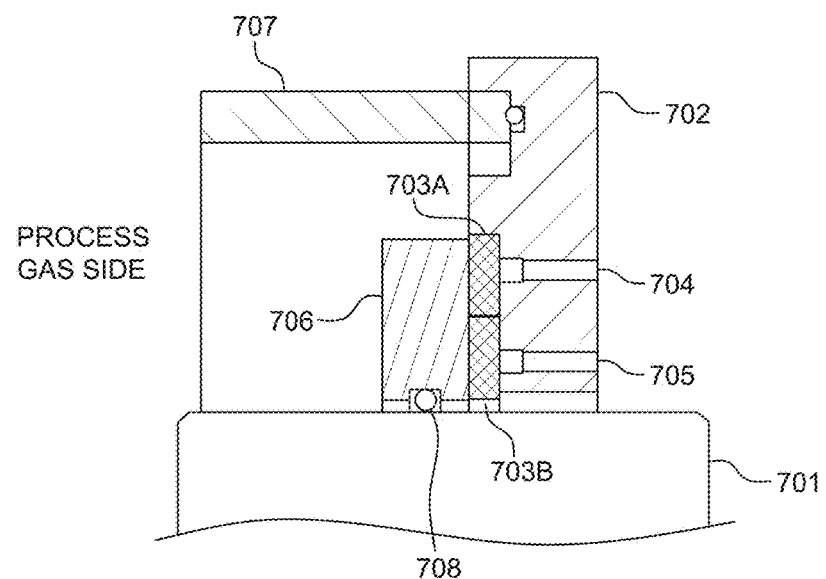
FIG. 7 is an example of a 2-port ventless seal with two porous media members.
Figure 8:
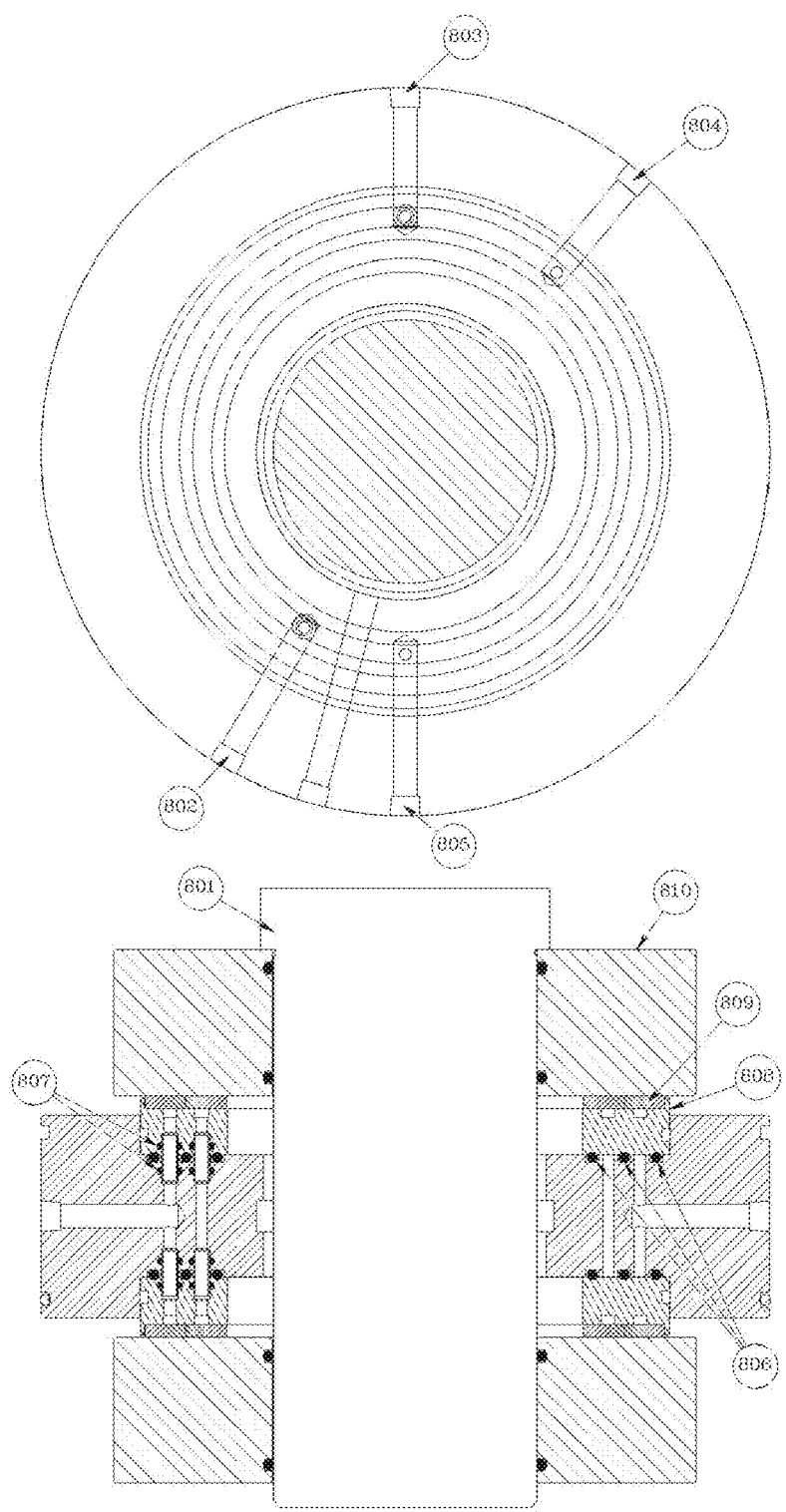
FIG. 8 is a depiction of a ventless seal showing details of conductive passages for adjustability options.

In FIG. 7, the porous media face is shown as two separate members, 703A and 703B. This allows the individual members to be sealed at the interface line shown, in order to provide a barrier to prevent any mixing of gases or fluids (within the porous media), which enter through the ports shown. Other items in FIG. 7 include porous media holder 702, which is attached to compressor head 707, and holder 702 may contain grooves 704 and 705. A runner 706 may be attached to a rotatable shaft 701 via O-ring 708. Other than the sealed interface feature, the function of this arrangement is similar to that of FIG. 4.

Figure 9A:
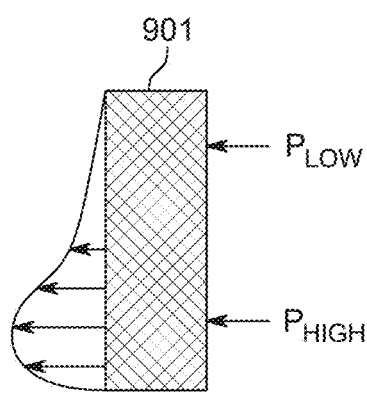
FIG. 9A shows a depiction of the gap pressure profile for a ventless seal having low input pressure at the outside diameter of the porous media ring, and high input pressure at the inside diameter of the porous media ring.
Figure 9B:
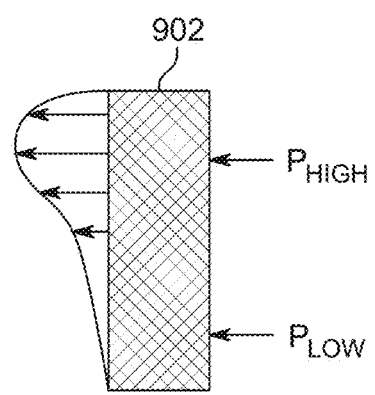
FIG. 9B shows a depiction of the gap pressure profile for a ventless seal having high input pressure at the outside diameter of the porous media ring, and low input pressure at the inside diameter of the porous media ring

To further illustrate the functional benefits of pressure balancing via the pressures supplied to the porous media, FIGS. 9A and 9B are presented. It is assumed that in both cases (FIGS. 9A and 9B) that there is a plurality of plenums, as well as ports, under the porous media ring, through which gas or fluid is introduced into the porous media, although these are not shown in the figures. FIGS. 9A and 9B show the effect of introducing a high pressure into one port, and a low pressure into another port. The resulting pressure profiles at the porous media faces 901 and 902 are proportional to the magnitude of pressures introduced in each port.

Another potential use for the ventless seal is to incorporate this arrangement in place of a typical inner labyrinth seal, as shown by items 113 in FIG. 1A and 212 in FIG. 2A, or in place of a typical barrier seal, as shown by items 107 and 207 in FIGS. 1A, 1B, 2A, and 2B.

Figure 10:
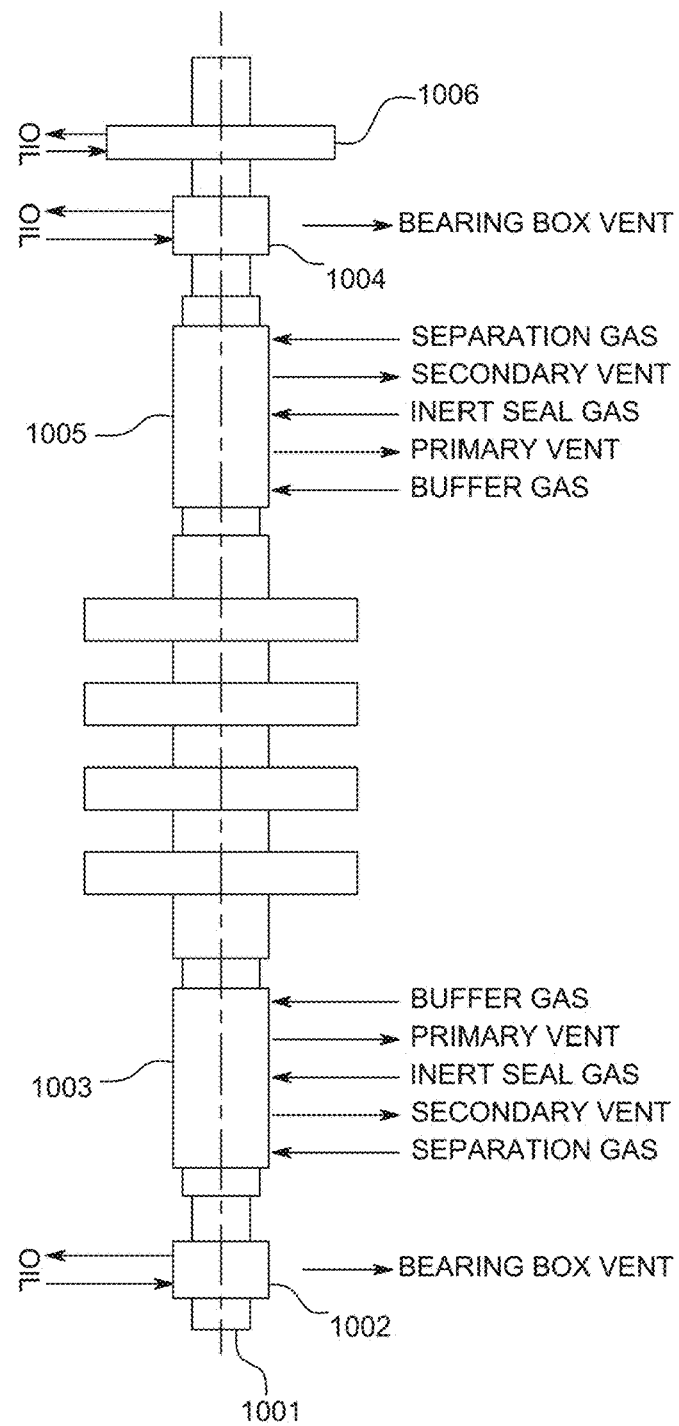
FIG. 10 is an example layout for a compressor, showing locations for radial bearings, thrust bearings, and seals.

FIG. 10 is an example of a rotating assembly for a typical compressor, showing locations for radial bearings, thrust bearings, and seals. FIG. 10 shows a rotatable shaft 1001 with two radial bearings 1002 and 1004, two shaft seals (commonly dry gas seals) 1003 and 1005, and a thrust bearing 1006. Often, a balance piston, not shown, is also included to minimize thrust loading. Furthermore, each of these components has accompanying inputs and outputs. For example, dry gas seals 1003 and 1005 have incoming buffer gas, incoming inert seal gas, incoming separation gas, and two outgoing vents. Radial bearings 1002 and 1004 have oil inputs and drains, along with a bearing box vent. Also, a thrust bearing 1006 has an oil input and drain. Hence, a typical arrangement will have six vents, two drains, three seal gases, and oil.

Figure 11:
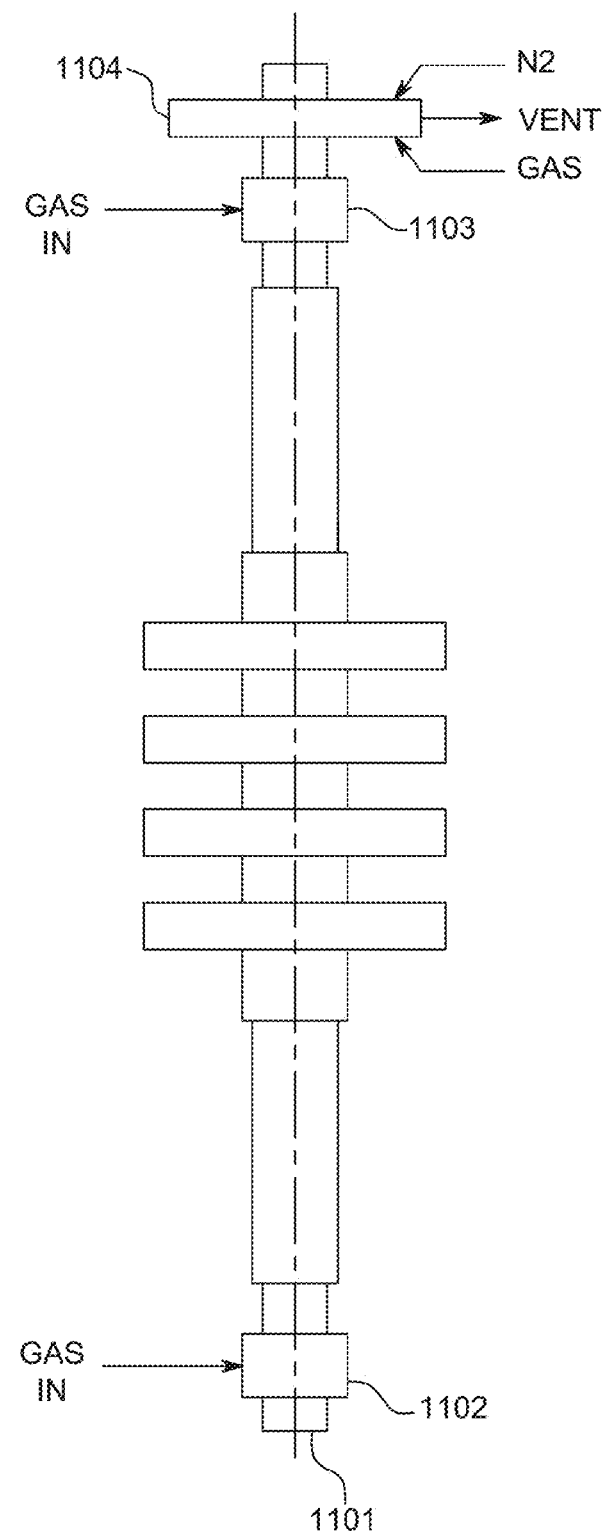
FIG. 11 is an example layout for a compressor, showing locations for radial bearings, and a ventless seal at the thrust bearing location.

FIG. 11 shows an example of how the thrust bearing alone can be used as the only seal for a rotating assembly of a centrifugal compressor. In FIG. 11, a rotatable shaft 1101 is supported by two externally-pressurized gas radial bearings 1102 and 1103. It is noted that there is no longer the need for an oil input and drain, and also no longer the need for a bearing box vent. The radial bearings 1102 and 1103 may be externally pressurized with treated process gas at a pressure which is 50 to 300 psig higher than the compressor's process gas. Leakage out of the radial bearings will mix with the process gas inside the compressor. It is also noted that the shaft seals have also been eliminated in FIG. 11, as the thrust bearing 1104 now acts as the only seal needed for the rotating assembly in order to prevent leakage of process gas to the atmosphere. It is assumed that the rotating assembly on the non-thrust bearing end will be enclosed (capped), or otherwise configured so as not require any sealing. The axial locations of the externally-pressurized gas radial bearings may also now be able to move to the former location of the shaft seals, if so desired, essentially shortening the length of the rotor, which may add to system rotordynamic stability. Also, the axial location of the thrust bearing may also now be able to move to the former location of the radial bearing on the left side of the FIG. 11 arrangement, if so desired, further allowing for shortening of the shaft.

In FIG. 11, the function of the thrust bearing 1104 is to not only bear the axially-generated thrust loads acting on the rotating assembly, but also to act as the primary (and only) seal needed for a centrifugal compressor. This seal will function as a ventless seal, as in the aforementioned discussion. Hence, treated process gas may be introduced into a plenum, such as plenum 704 in FIG. 7, and an inert gas such as Nitrogen may be introduced into a plenum, such as plenum 705 in FIG. 7. The injected pressure of the treated process gas and the inert gas will be 50-300 psig higher than the compressor's process gas, therefore allowing all of the treated process gas to flow into the compressor's process gas. None of the treated process gas will be able to leak out of the shaft due to the presence of the Nitrogen's pressure introduced into the other portion of this ventless seal. Hence, only Nitrogen will need to be vented at the thrust bearing location 1104. Using the FIG. 11 arrangement allows the use of one vent, two seal gases, and no oil, as compared to the current art's FIG. 10 arrangement which uses six vents, two drains, three seal gases, and oil.

In certain situations, a balance piston is used to also control axial loads acting on the rotating assembly, as well as limiting the size of the thrust bearing needed. A balance piston is typically mounted on the shaft near the discharge of a compressor. Balance pistons are typically a disk along with a labyrinth seal which allows leakage that gets directed back to the suction side of the compressor. While balance pistons mitigate thrust, they also affect a compressor's efficiency by as much as 20 percent in high pressure machines.

Figure 12:
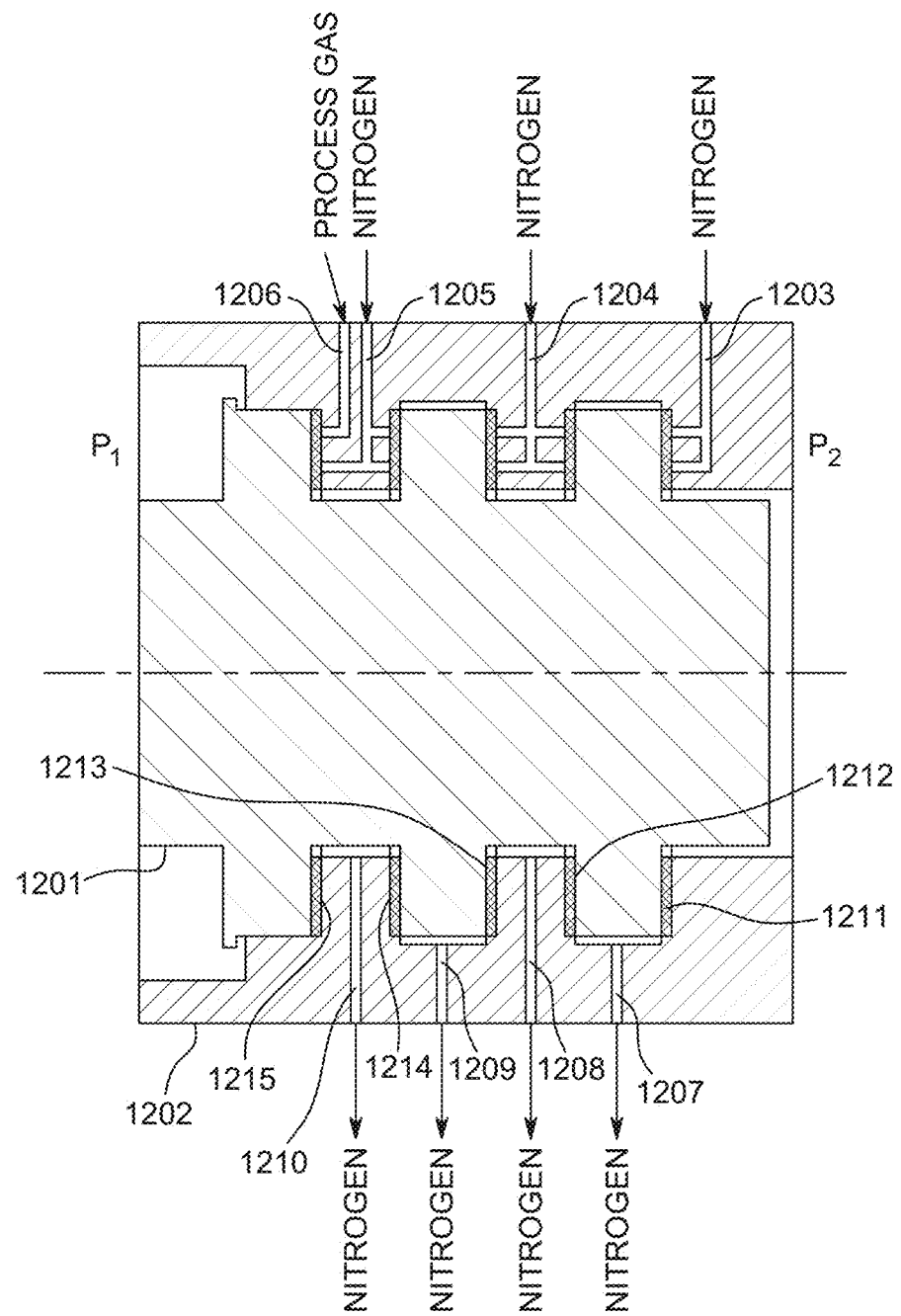
FIG. 12 is an example of a balance piston incorporating porous media ventless seal features, with thrust being borne by nitrogen

FIG. 12 shows an example of a ventless seal version of a balance piston 1201 in a housing 1202. In this embodiment, multiple thrust faces are shown. Externally-pressurized porous media is included at each thrust face in balance piston 1201, as shown by items 1211, 1212, 1213, 1214, and 1215. The pressure denoted by P1 represents the process gas side of the system. As an example, pressure P1 could be 2,000 psig, and pressure P2 could be at 0 psig. Input ports 1203, 1204, 1205 and 1206 allow for the introduction of gases as shown. Vents are shown as 1207, 1208, 1209 and 1210.

As an example of operation, in FIG. 12, assuming P1 being 2,000 psig, Nitrogen may be introduced into port 1205 at 2,080 psig, and treated process gas may be introduced into port 1206 at 2,080 psig. Since this treated gas is higher than the actual process gas at 2,000 psig, leakage will flow into the process gas, but not in the other direction. Nitrogen may then be introduced into ports 1204 and 1203 at 1,080 psig and 80 psig, respectively. By allowing Nitrogen to be vented via vents 1210, 1209, the pressure across the total balance piston may be stepped down from P1 of 2,000 psig to P2 being 0 psig. The Nitrogen carries the load across the balance piston, and no leakage of process gas from the compressor results. It is also noted that, P2 does not need to be 0 psig, but may be at another pressure. The pressure of ports 1204 and 1203 can be set accordingly, to step down the pressure as needed.

Figure 13:
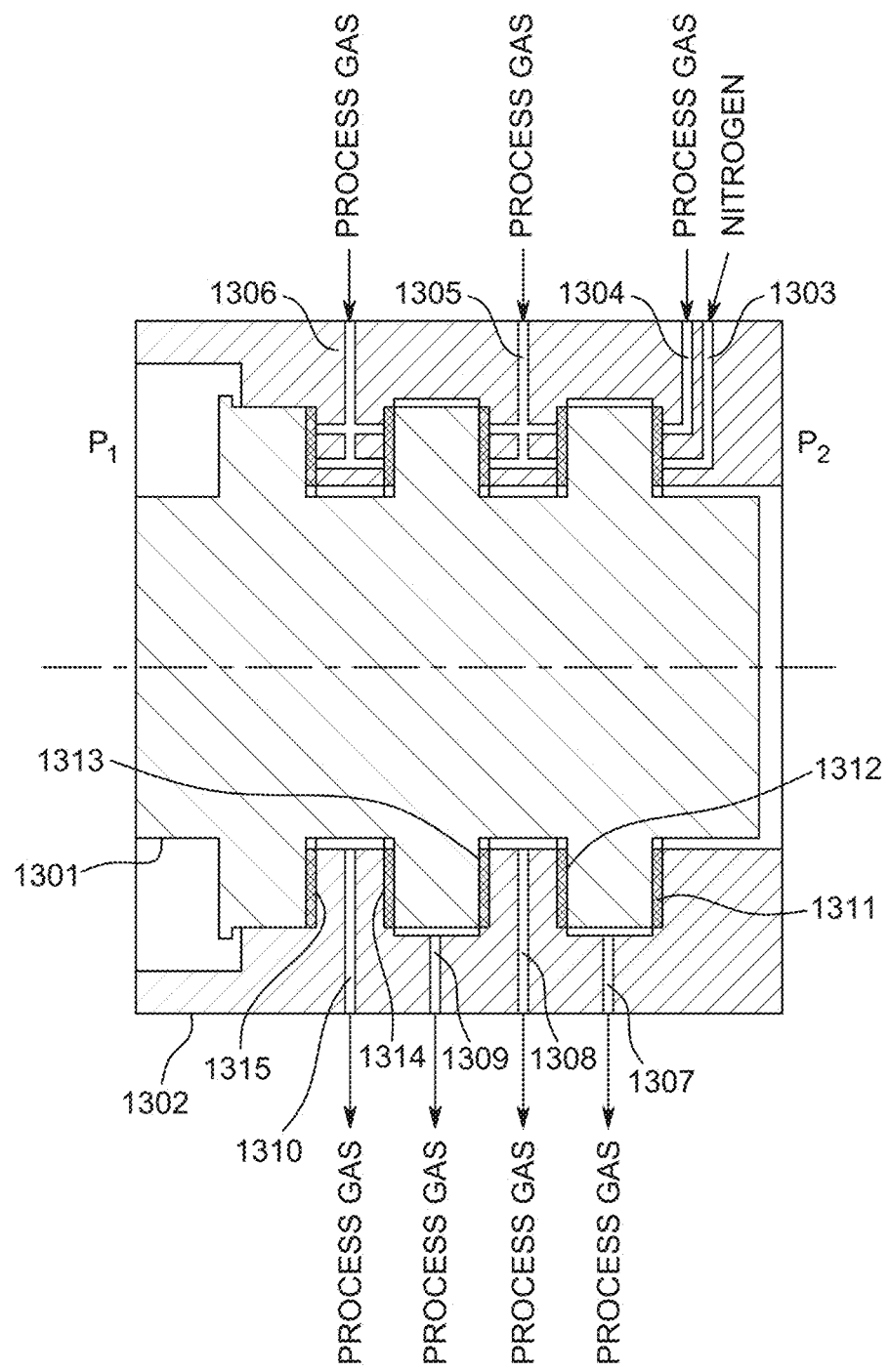
FIG. 13 is an example of a balance piston incorporating porous media ventless seal features, with thrust being borne by treated process gas.

The ventless balance piston can also operate slightly differently than as described in the previous example. FIG. 13 shows a ventless balance piston 1301 in a housing 1302. In this embodiment, multiple thrust faces are shown. Externally-pressurized porous media is included at each thrust face in balance piston 1301, as shown by items 1311, 1312, 1313, 1314, and 1315. The pressure denoted by P1 represents the process gas side of the system. As an example, pressure P1 could be 2,000 psig, and pressure P2 could be at 0 psig. Input ports 1303, 1304, 1305 and 1306 allow for the introduction of gases as shown. Vents are shown as 1307, 1308, 1309 and 1310.

As an example of operation, in FIG. 13, assuming P1 being 2,000 psig, Treated process gas may be introduced into port 1306 at 2,080 psig, port 1305 at 1,080 psig, and port 1304 at 80 psig. Nitrogen may be introduced into port 1303 at 80 psig. By allowing process gas to be vented (back into the process gas of the compressor) via vents 1307, 1308, 1309 and 1310, the pressure across the total balance piston may be stepped down from P1 of 2,000 psig to P2 being 0 psig. The process gas carries the load across the balance piston, and no leakage of process gas from the compressor results, since at the final stage of the balance piston Nitrogen is injected at the same pressure (80 psig) as the injected process gas at the last stage. It is also noted that, P2 does not need to be 0 psig, but may be at another pressure. The pressure of ports 1204 and 1203 can be set accordingly, to step down the pressure as needed. It is noted that there are countless other possibilities for stepping down the thrust loading by injecting various gases and pressures, as shown by the last two examples.

Figure 14:
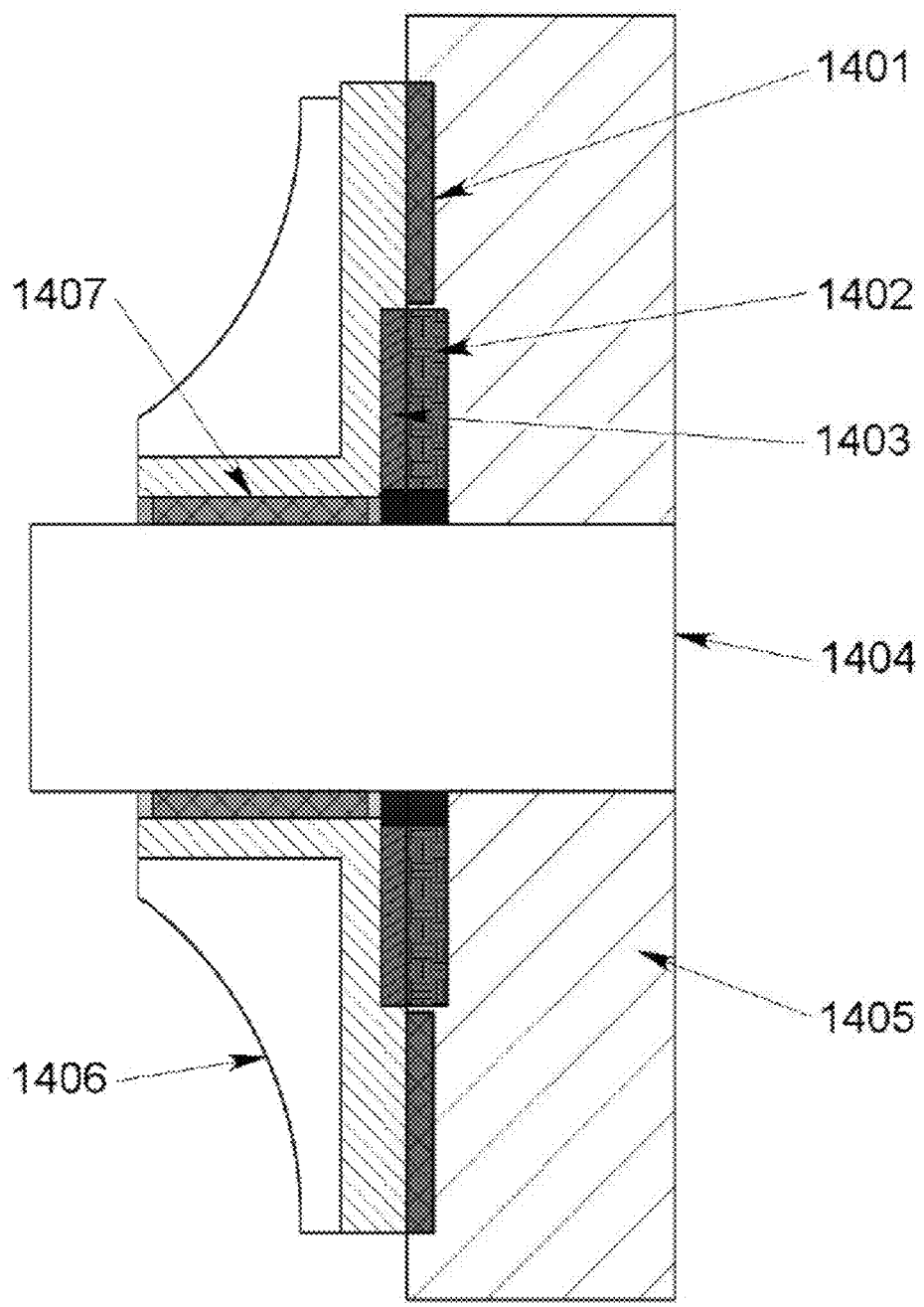
FIG. 14 is a depiction of a thrust bearing serving as a seal in a fixed shaft application.

FIG. 14 shows an example of a thrust bearing acting as a seal for a stationary shaft application. In this case, a motor magnet 1403 and coil 1402 create rotating motion for an impeller 1406, which could be an impeller for an expander or a compressor. A porous media stationary radial bearing 1407 is mounted on the outside diameter of stationary shaft 1404 and accommodates the radial loading. This radial bearing also acts as a shaft seal. Furthermore, a porous media thrust bearing 1401 is mounted to the housing 1405 of the compressor or expander. This thrust bearing 1401 bears the axial loading of the impeller, and also acts as a seal in the case where the motor cavity is vented or cooled.

The porous media discussed herein may be comprised of any porous or sintered material such as graphite, carbon, silicon carbide, porous diamond, Tungsten carbide, alumina, carbon-carbon, a porous carbon base material with a diamond or diamond-like coating, etc. The manufacture of porous media may employ ceramic casting techniques commonly known in the art, but may also employ other methods such as 3-D printing.

While preferred embodiments have been set forth in detail with reference to the drawings, those skilled in the art who have reviewed the present disclosure will readily appreciate that other embodiments can be realized within the scope of the invention, which should therefore be construed as limited only by the appended claims.

What is claimed is:

1. A rotating equipment comprising:
an assembly having a first end and a second end, wherein the second end is configured to prevent leakage of a process side gas;
a rotating shaft entering the assembly at the first end; and
an externally pressurized thrust bearing comprising at least one porous media element positioned over a plurality of plenums, wherein the externally pressurized thrust bearing is configured to support the rotating shaft and to seal the process side gas inside the assembly at the first end.

2. The rotating equipment of claim 1 wherein the second end of the assembly is capped.

3. The rotating equipment of claim 1 wherein the externally pressurized thrust bearing is a ventless seal.

4. The rotating equipment of claim 1 wherein no additional shaft seals are required.

5. The rotating equipment of claim 1 further comprising radial bearings, wherein the radial bearings are externally pressurized gas bearings.

6. A rotating equipment comprising:
an assembly having a first end and a second end, wherein the second end is configured to prevent leakage of a process side gas;
a rotating shaft entering the assembly at the first end; and
an externally pressurized thrust bearing configured to support the rotating shaft and to seal the process side gas inside the assembly at the first end, wherein the externally pressurized thrust bearing is configured to serve as a balance piston and wherein the externally pressurized thrust bearing further comprises four porous media rings positioned over a plurality of plenums and having conductive passages for communicating pressurized gas to the plurality of plenums through input ports, and also further comprises four vent holes, resulting in zero leakage of treated process gas out of the compressor.

7. The rotating equipment of claim 6 wherein the pressure may be balanced across the seal faces by adjusting input gas pressures at a input ports.

8. The rotating equipment of claim 6 wherein either treated process gas or an inert gas may be introduced into the input ports in order to balance the thrust loading.

9. The rotating equipment of claim 6 wherein the four porous media rings may be comprised of any porous or sintered material such as graphite, carbon, silicon carbide, porous diamond, Tungsten carbide, alumina, carbon-carbon, or a porous carbon base material with a diamond or diamond-like coating, or may be manufactured using 3-D printing.

* * * * *